March 22, 1960  R. E. SKOW  2,929,068
MACHINE FOR MAKING AND APPLYING CLASPS TO ENVELOPES
Original Filed Oct. 18, 1954  13 Sheets-Sheet 1

Fig. 1.

INVENTOR.
Ross E. Skow
BY
Paul E. Mullendore
ATTORNEY

March 22, 1960 R. E. SKOW 2,929,068
MACHINE FOR MAKING AND APPLYING CLASPS TO ENVELOPES
Original Filed Oct. 18, 1954 13 Sheets-Sheet 2

INVENTOR.
Ross E. Skow
BY
Paul E. Mullendore
ATTORNEY

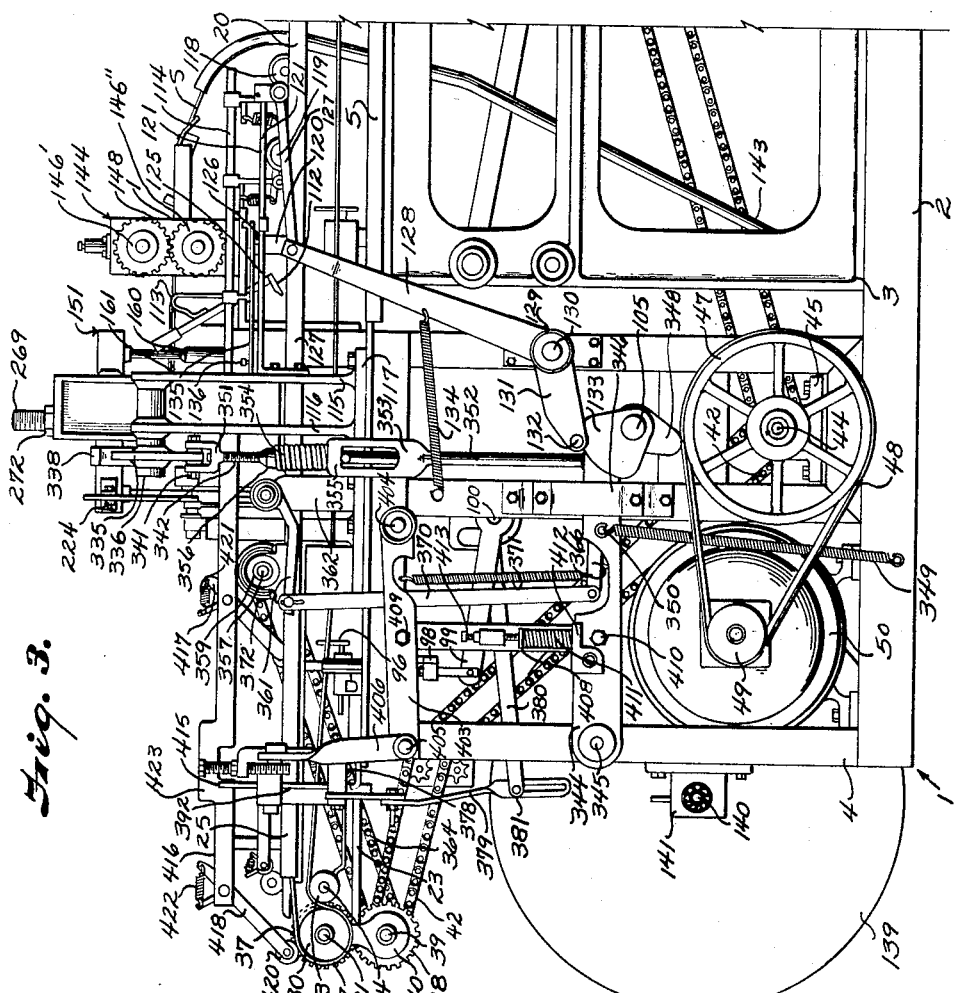
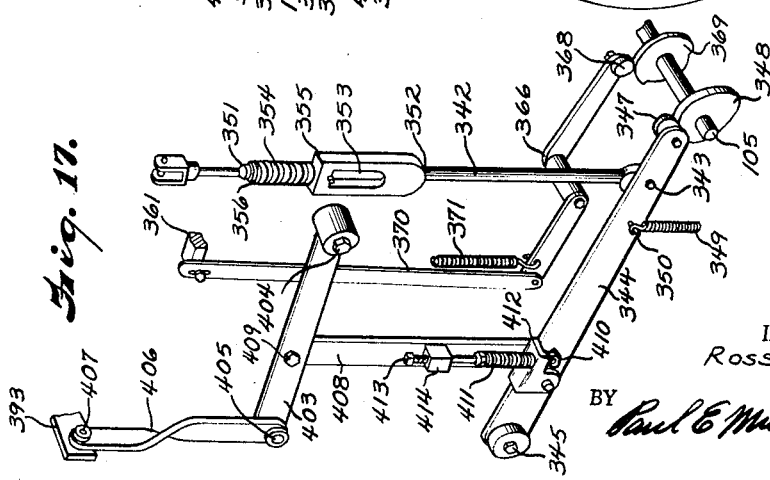
INVENTOR.
Ross E. Skow
BY Paul E. Mullendore
ATTORNEY

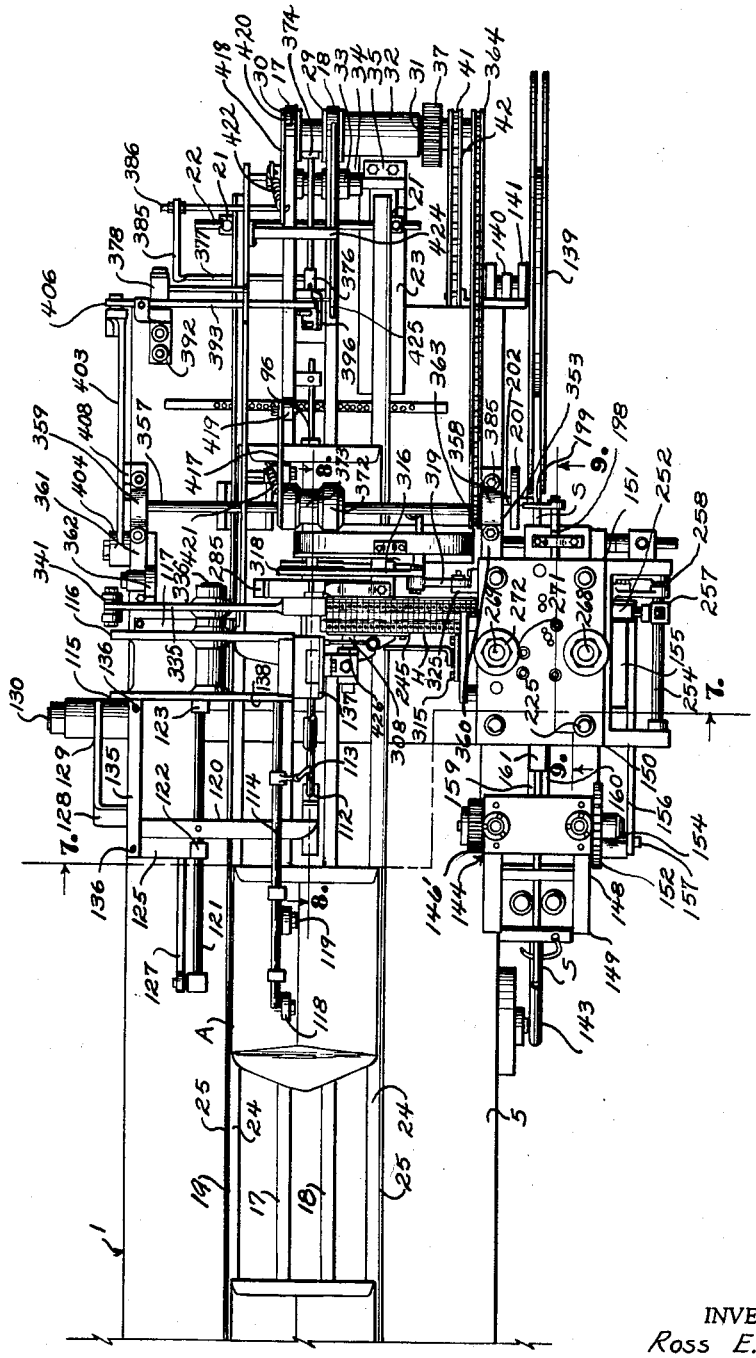

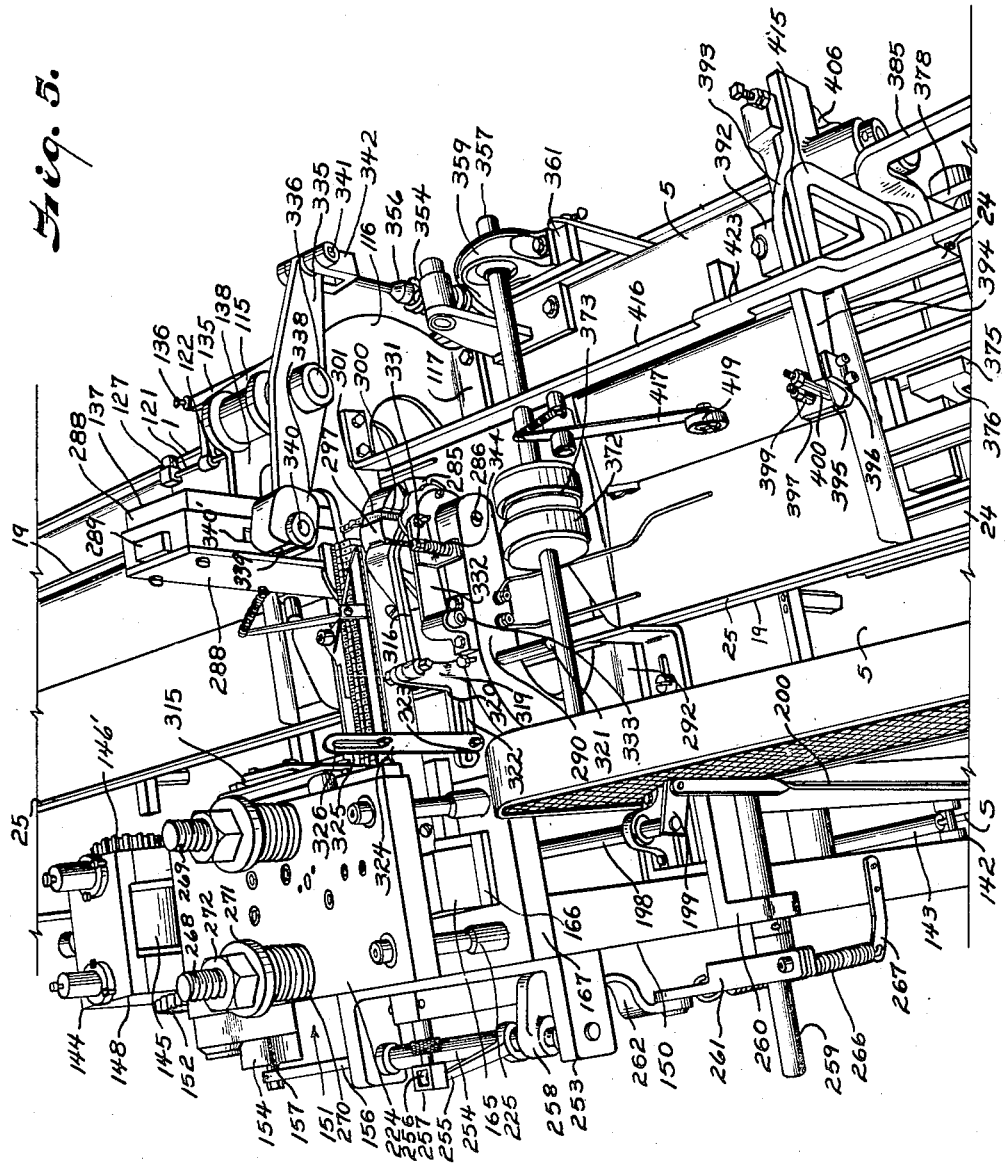

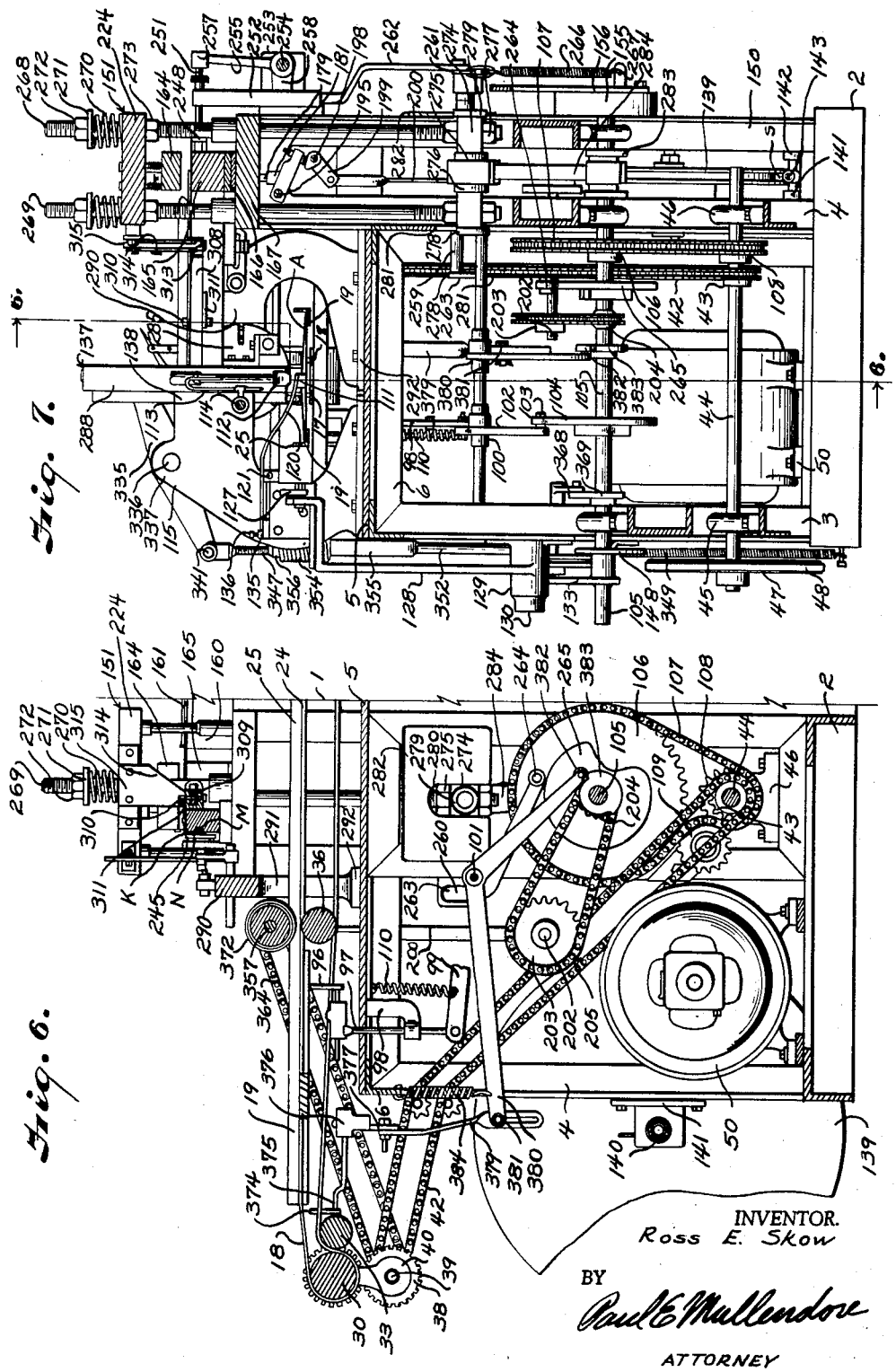

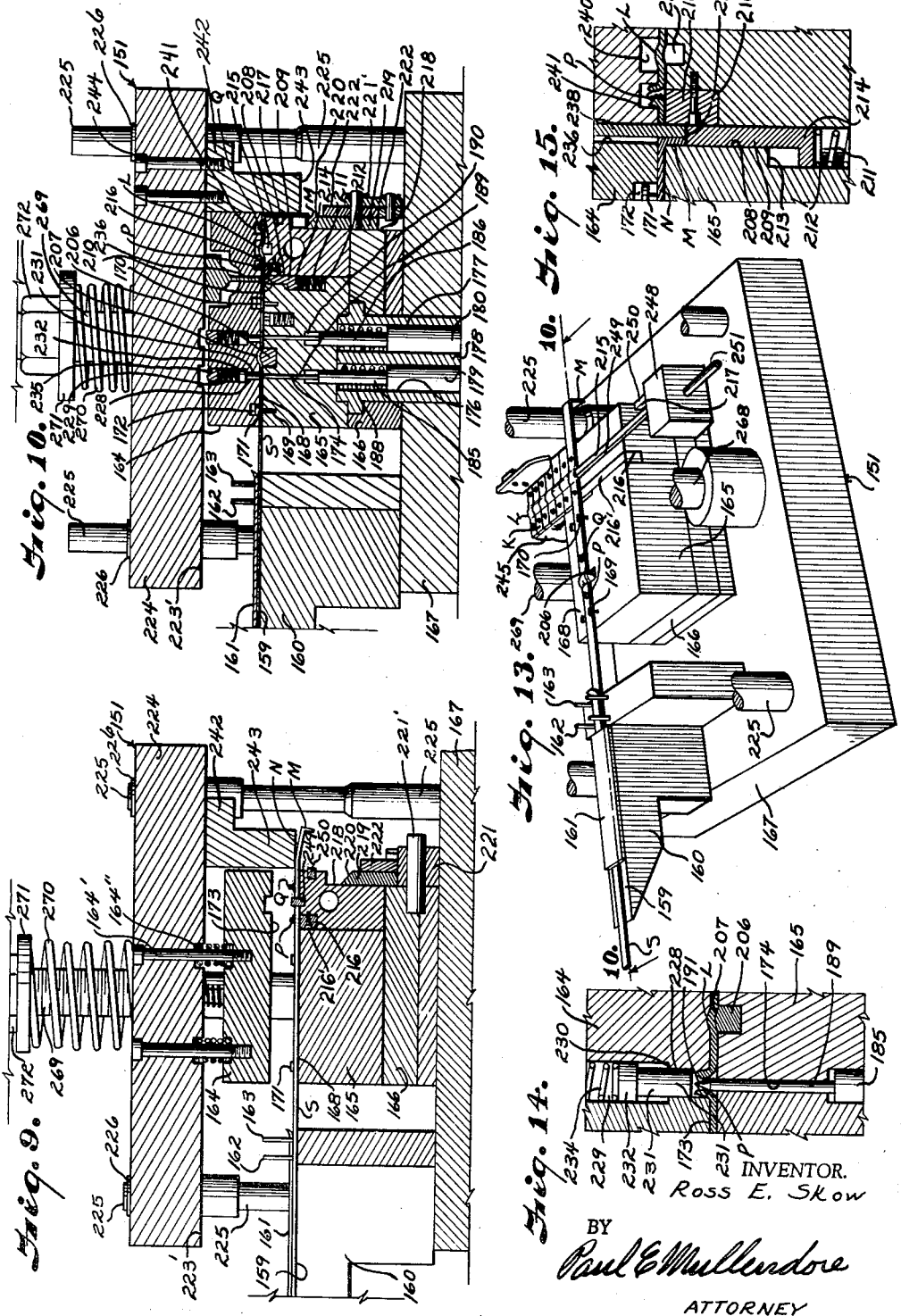

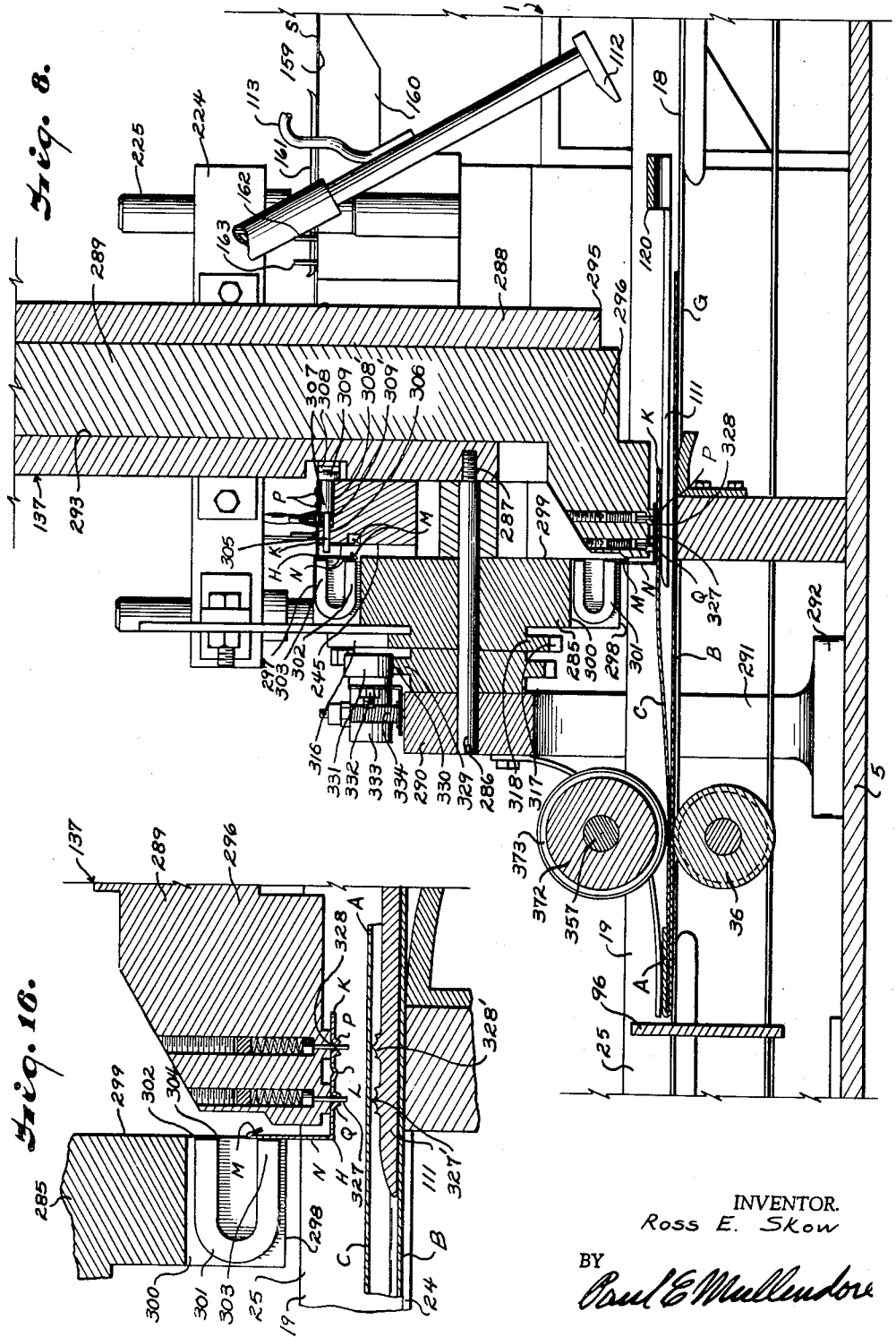

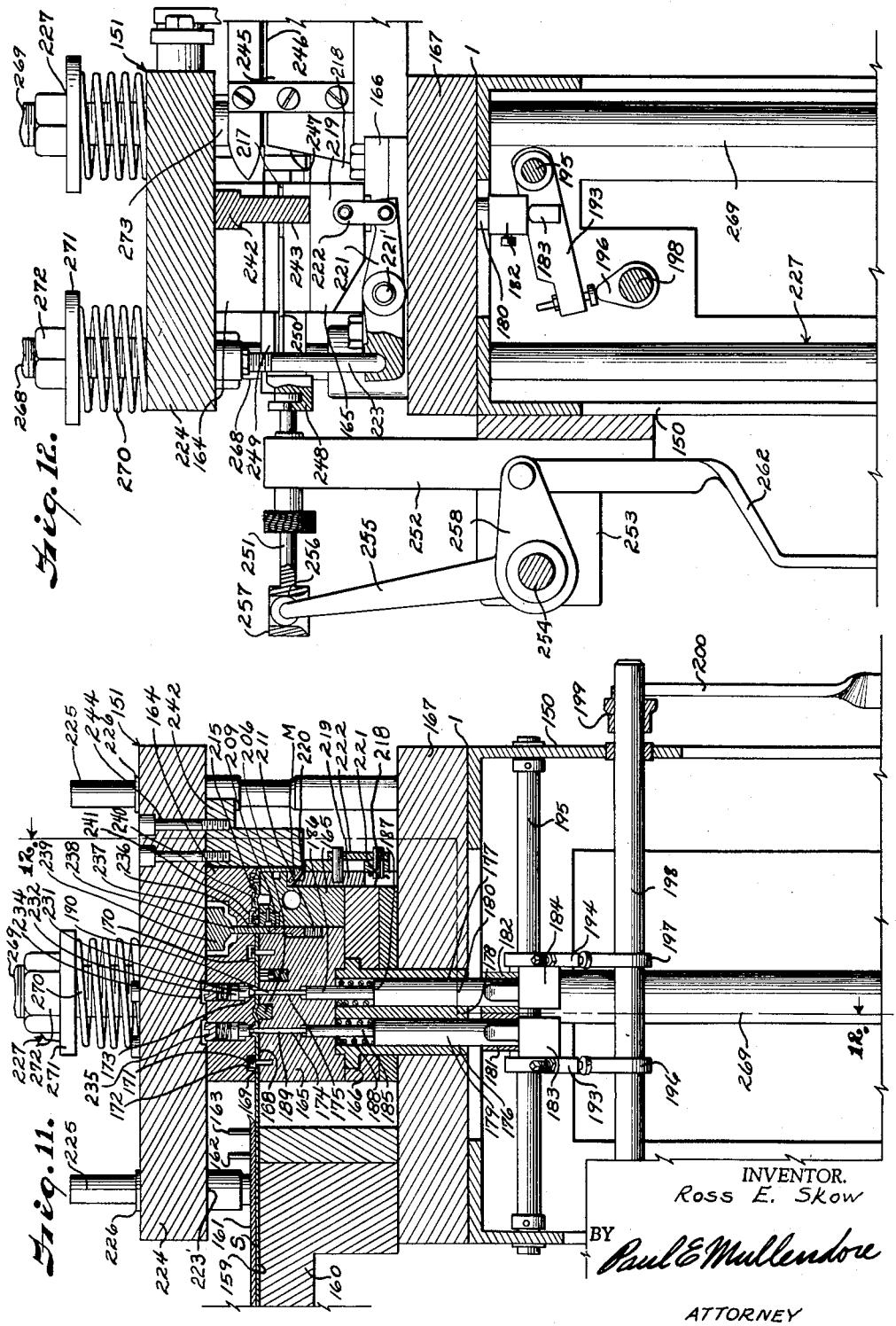

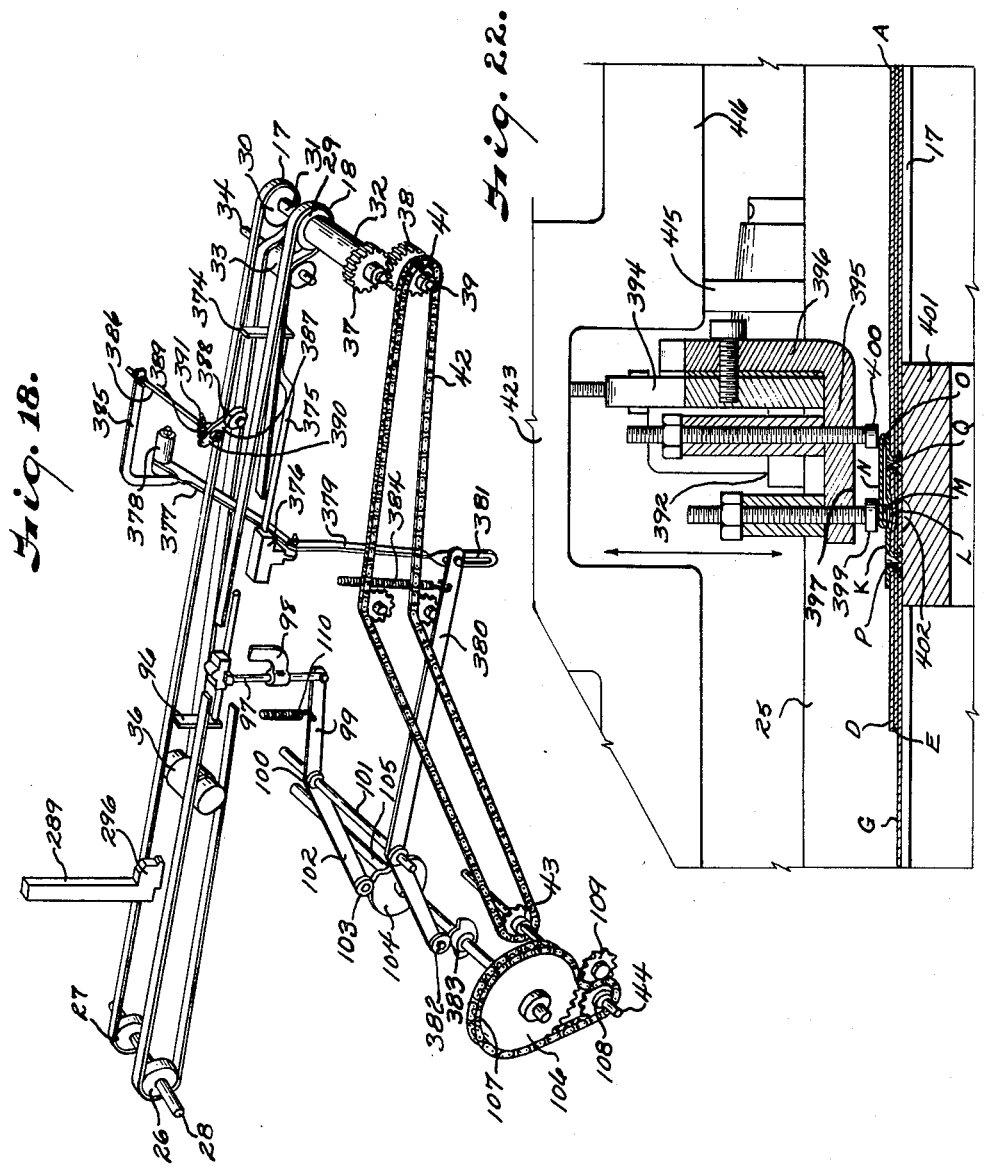

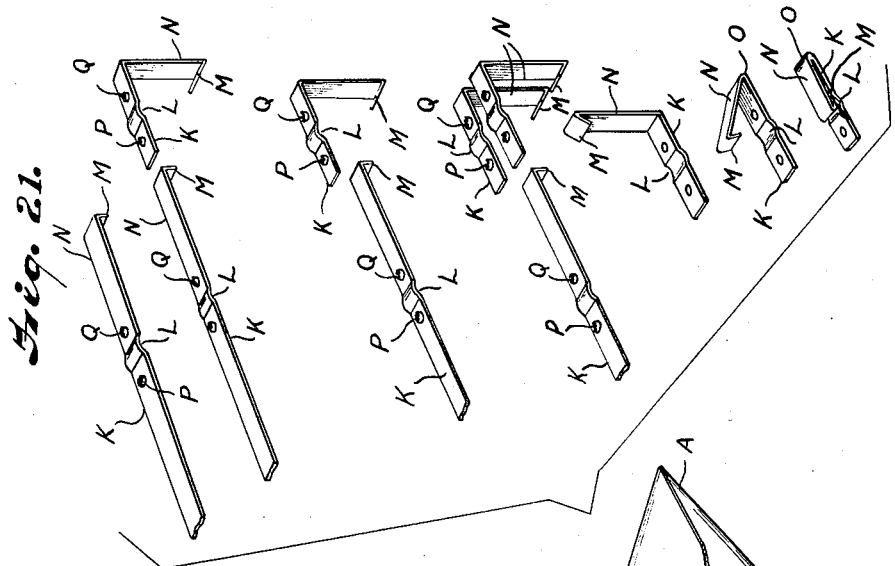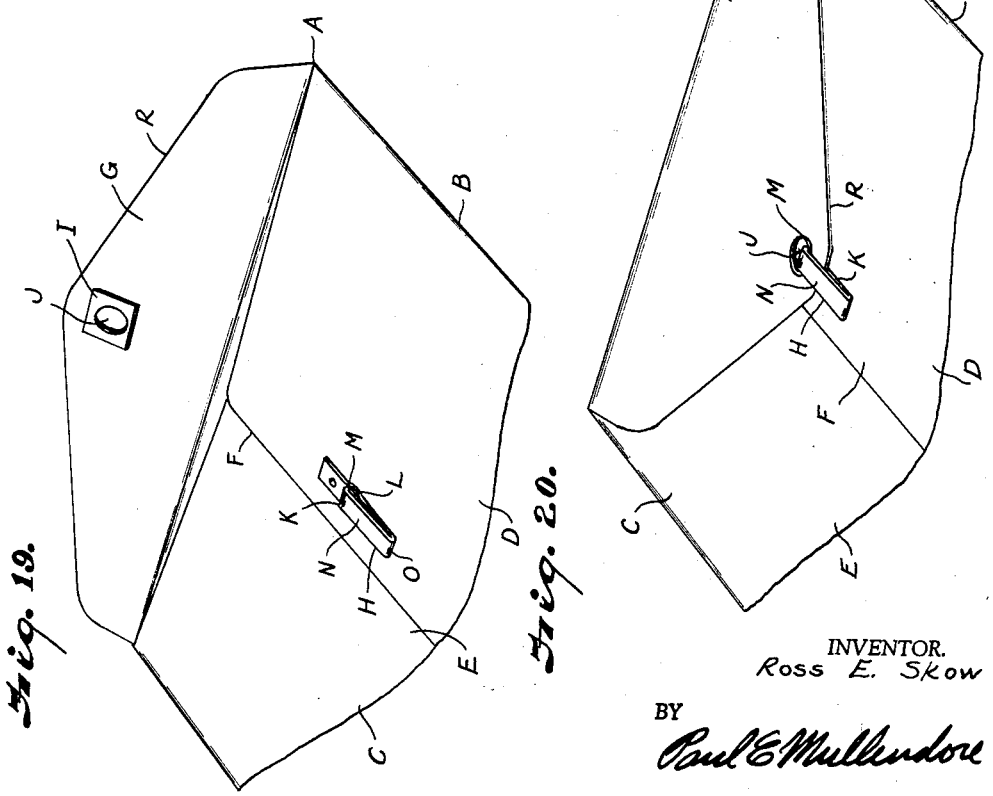

March 22, 1960 R. E. SKOW 2,929,068
MACHINE FOR MAKING AND APPLYING CLASPS TO ENVELOPES
Original Filed Oct. 18, 1954 13 Sheets-Sheet 12
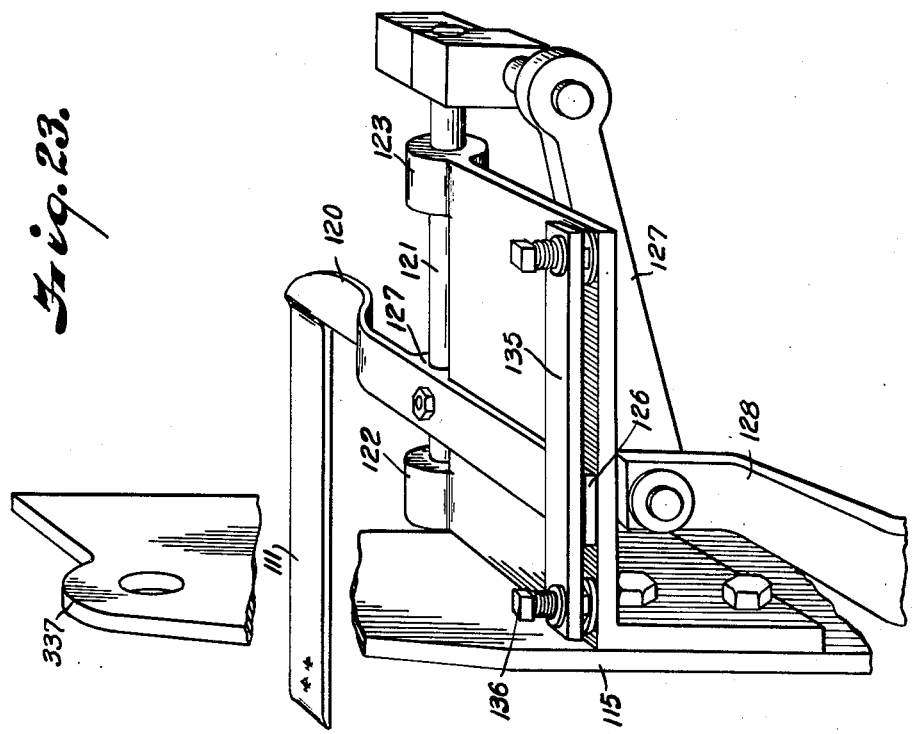
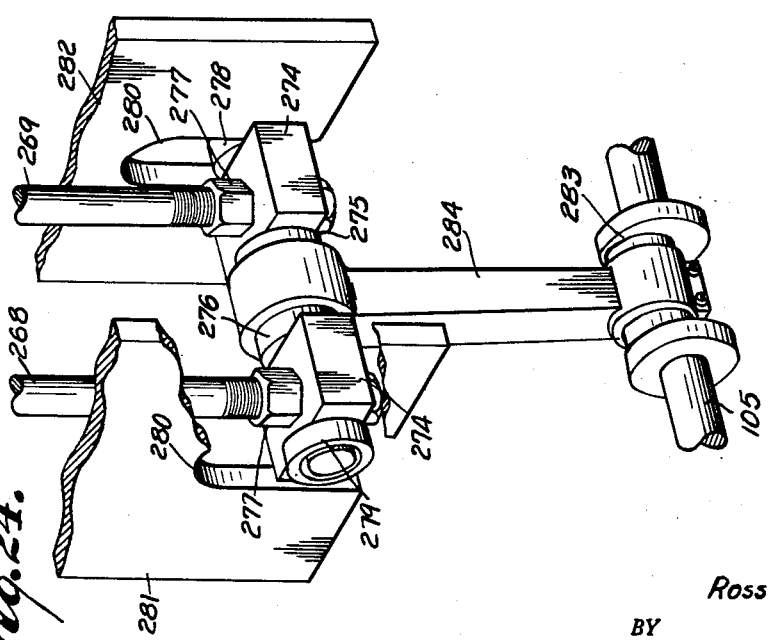
INVENTOR.
Ross E. Skow
BY
Paul E. Mullendore
ATTORNEY March 22, 1960  R. E. SKOW  2,929,068
MACHINE FOR MAKING AND APPLYING CLASPS TO ENVELOPES
Original Filed Oct. 18, 1954  13 Sheets-Sheet 13
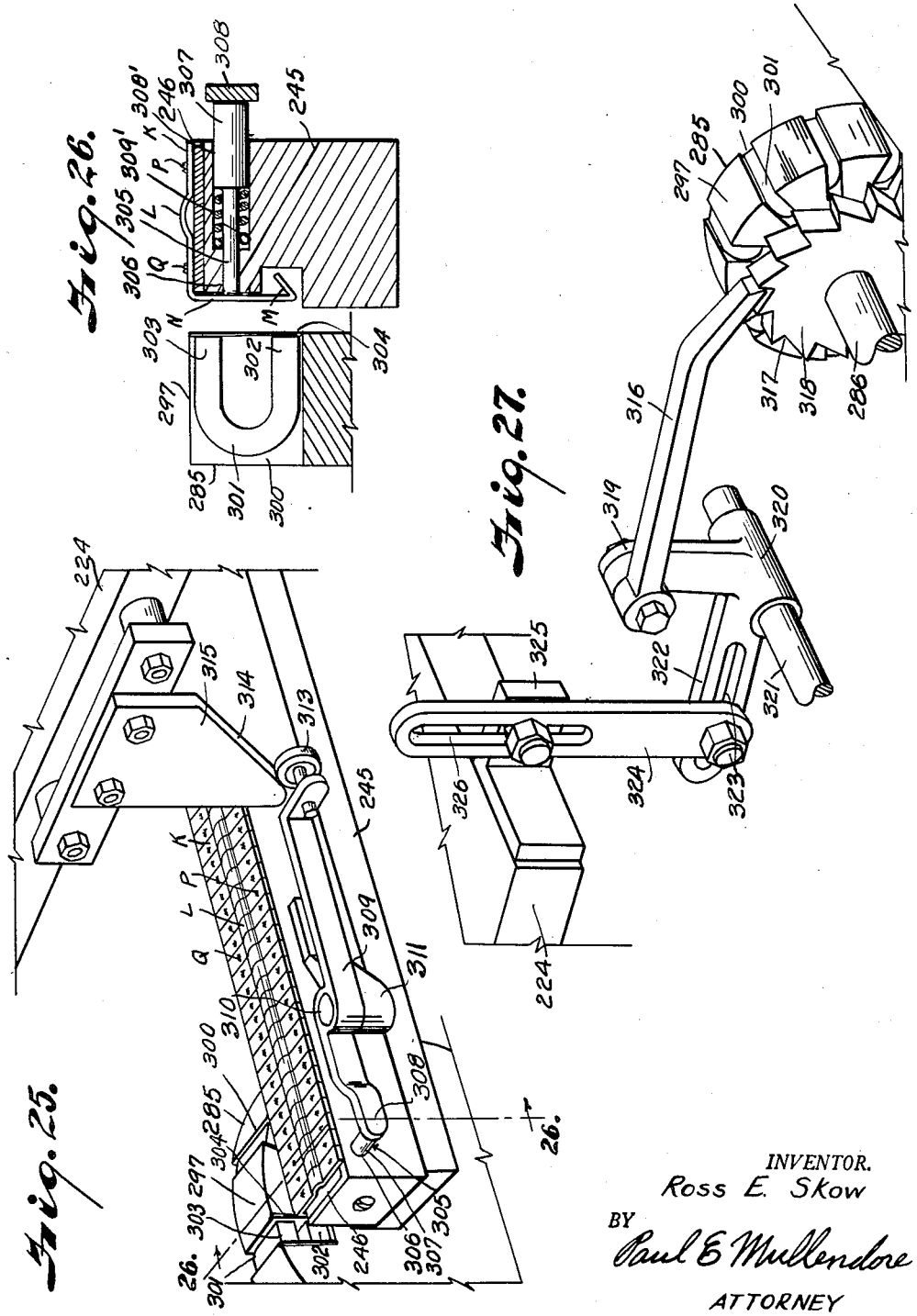
INVENTOR.
Ross E. Skow
BY
Paul E. Mullendore
ATTORNEY United States Patent Office 2,929,068
Patented Mar. 22, 1960

2,929,068

MACHINE FOR MAKING AND APPLYING CLASPS TO ENVELOPES

Ross E. Skow, Kansas City, Mo., assignor, by mesne assignments, to Engineered Specialties Corporation, Kansas City, Mo., a corporation of Missouri Original application October 18, 1954, Serial No. 462,723, now Patent No. 2,852,842, dated September 23, 1958. Divided and this application April 10, 1958, Serial No. 727,727

18 Claims. (Cl. 1—95)

This invention relates to a machine for making and applying clasps to envelopes, the clasps being of a type disclosed in United States Letters Patent No. 2,349,127, issued May 16, 1954, the present application being a division of my copending application for patent filed October 18, 1954, Serial No. 462,723, now Patent No. 2,852,842, issued September 23, 1958.

The principal objects of the present invention are to provide means for making clasp blanks from a rolled strip material, feeding the clasp blanks and envelopes into position for application of the clasp blanks to the envelopes, and completing the formation of the clasp blanks into clasps after attachment of the clasp blanks to the envelopes.

Other objects of the invention are to provide a single machine which automatically forms the clasp blanks from rolled strip material and feeds the blanks in timed relation with the feed of the envelopes; to provide the machine with magnetic means for transfer of the clasp blanks from the forming means in a reserve series to the means for applying the clasp blanks to the envelopes; to provide a die structure which avoids fouling of the machine during formation of the clasp blanks; to provide the machine with means for effecting automatic removal of the clasps in case of skipped envelopes or malformed clasps; and to provide a machine which maintains control of the envelopes as well as the clasp blanks during the formation of the clasp blanks and application thereof to the envelopes.

In accomplishing these and other objects of the invention hereinafter pointed out, I have provided an improved apparatus, the preferred form of which is illustrated in the accompanying drawings, wherein:

Fig. 1 is a perspective view of a machine constructed in accordance with the present invention and which is adapted for making and attaching clasps to envelopes.

Fig. 2 is an elevational view of one side of the machine.

Fig. 3 is an elevational view of the opposite side of the machine.

Fig. 4 is a plan view of the machine.

Fig. 5 is a perspective view of the clasp-blank forming and applying sections of the machine as viewed from above.

Fig. 6 is a partial longitudinal section through the machine on the line 6—6 of Fig. 7.

Fig. 7 is a cross section through the machine on the line 7—7 of Fig. 4.

Fig. 8 is an enlarged longitudinal section through a part of the machine on the line 8—8 of Fig. 4, looking in the direction of the arrows.

Fig. 9 is an enlarged longitudinal section through the blank forming dies and die shoes, showing the dies in spaced relation for entrance of the strip material and advancement of a blank partially formed by the dies on a previous operation, the section being taken through both dies at the point indicated by the line 9—9 of Fig. 4.

Fig. 10 is a similar section showing the dies closed to form additional operations on the partially formed blanks and severing of a blank therefrom of a previously completed blank, the section being taken through both dies along a line indicated by the line 10—10 of Fig. 13.

Fig. 11 is a section through the dies similar to Fig. 10 but showing complete closure of the dies and projection of the punch pins thereof that form the prongs on the clasps.

Fig. 12 is a section through the dies on the line 12—12 of Fig. 11.

Fig. 13 is a perspective view of the lower die shoe and lower die carried thereby, particularly illustrating the transfer device for removing the blanks from the die and aligning the blanks for advancement along a guide rail to the magnetic transfer or carrier device.

Fig. 14 is an enlarged fragmentary section showing formation of the prongs on the clasps.

Fig. 15 is an enlarged section showing the means for cutting off the individual clasps and bending the hook terminals on the clasp blanks.

Fig. 16 is an enlarged section through the foot of the clinching mechanism and anvil and particularly illustrating the pins for positioning the clasps on the envelopes and showing the clinching foot in the act of withdrawing a clasp blank from a magnet of the transfer device.

Fig. 17 is a detailed perspective view of the cam and levers for actuating the clinching mechanism and the mechanisms for producing the final shaping of the clasps after they have been applied to the envelopes.

Fig. 18 is a diagrammatically perspective view of the various envelope stops and operating parts of the machine.

Fig. 19 is a perspective view of an envelope showing a clasp applied thereto with the closure flap in open position.

Fig. 20 is a similar view showing the closure flap of the envelope in closed position and secured by the clasp.

Fig. 21 is a diagrammatic view, showing the various steps of forming a rolled strip into a clasp blank.

Fig. 22 is a transverse section through the pressure applying head particularly illustrating the final bending of the clasps.

Fig. 23 is a perspective view of the anvil and supporting mechanism therefor.

Fig. 24 is a detail perspective view of the cross head, crank and connecting rod for actuating the upper die shoe.

Fig. 25 is a perspective view of the mechanism for operating the push pin by which the clasp blanks are moved into contact with the transfer or carrier device by which they are placed in applicating position.

Fig. 26 is a fragmentary section on the line 26—26 of Fig. 25, to better illustrate the mounting of the push pin.

Fig. 27 is a detail perspective view of the ratchet mechanism for intermittently advancing the carrier device for transferring the clasp blanks from the horn to applicating position.

Referring more in detail to the drawings:

1 designates a machine constructed in accordance with the present invention for making clasp blanks, applying clasp blanks to envelopes, and completing the formation thereof into clasps on the envelopes, the clasps and envelopes being of a type disclosed in the above numbered patent, and shown in Figs. 19 and 20.

It will be noted in Figs. 19 and 20 that the envelope A is of conventional type in that it has a front side B and a back side C that is formed by side flaps D and E folded over the front side B and secured together in lapped relation to form a central seam F of two ply thickness. The front side B of the enevelope has a closure flap G which is adapted to be folded over the insert opening and secured to the clasp H, the flap G being preferably provided on the inner face with a washer I that is secured by a suitable adhesive and which has an opening J punched therethrough and through the material of the closure flap G.

The clasp H is formed by the machine 1 from a piece of rolled strip material to provide an elongated body portion K having a central transverse crimp or depression L for accommodating a hook-like terminal M on a resilient tongue portion N that is integral with one end of the body portion K and which is bent retractively as at O to bring the hook M into registry with the depression or crimp L. The clasp H is secured to the double-thick portion of the envelope that is provided by the central seam F by prongs P and Q that are stamped from the body portion at the respective sides of the transverse crimp L and which are projected through the envelope and clinched on the inner side thereof.

When the open end of the envelope A is to be closed, the closure flap G is folded over the insert opening and the free edge R is caused to pass between the hook M and the body portion K of the clasp H until the hook M is in position to pass through the opening J and engage the edge thereof as shown in Fig. 20.

When the flap G is to be opened, the tongue portion N of the clasp is raised slightly to permit disengagement of the hook M with the opening J in the closure flap G, whereupon the closure flap may be withdrawn from under the hook M. The particular feature of the envelope is the ease with which the closure flap G is secured and released, thereby providing an envelope of the clasp type which may be used many times without tearing the flap G or breaking the clasp H.

In carrying out the invention, the machine has means for making the clasp blanks, means for forwarding the blanks and envelopes A individually to a place for attachment of the blanks. The envelopes are preferably supplied with the closure flaps G open and provided with the opening J and reinforcing washers I applied, in timed relation with the clasp blanks. The machine also has means for applying the clasp blanks and means for completing the clasps.

The machine 1 includes a base 2, supporting side frames 3 and 4, carrying a table-like top 5, the side frames being interconnected by transverse rails 6. Carried on the table-like top 5 are conveyer belts 17 and 18 for carrying the envelopes in guided contact with rails 19, the rails being suitably carried on brackets 20 and 21, the brackets 21 being carried by a cross rail 22 mounted on a forwardly projecting arm 23.

The guide rails 19 are preferably angles having inwardly extending horizontal flanges 24 for support of the marginal side edges of the envelopes and vertical flanges 25 for guiding the envelopes and retaining them in registry with the clasp applying mechanism later to be described.

The envelope carrying belts are mounted at their rear ends on spaced rollers 26—27 on a shaft 28, having its end rotatably mounted near the base of the brackets 20 so as to support the upper runs of the belts 17 and 18 substantially in plane with the horizontal flanges 24 of the guide rails.

The belts 17 and 18 extend along the length of the machine and are guided over rollers 29 and 30 that are mounted on a transverse shaft 31. The shaft 31 is journaled in a bracket 32 that is carried on the projecting end of the arm 23. The lower runs of the belts extend upwardly over an idling roller 33 (Fig. 3) to increase contact of the belts with the rollers 29 and 30 (Fig. 18). The roller 33 is carried by a shaft 34 journaled in a part 35 of the bracket 32. The lower runs of the belts, after extending over the roller 33, pass under a roller 36 (Fig. 6) and extend therefrom substantially horizontally to the rollers 26 and 27, best shown in Fig. 1.

The shaft 31 is driven by a gear 37 mounted thereon and meshing with a driving gear 38 carried on a shaft 39, the shaft 39 being rotatably mounted in a depending part 40 of the bracket 32 as shown in Fig. 1.

The driving shaft 39 (Fig. 18) which carries the driving gear 38, has a sprocket 41, and operating over the sprocket is a drive chain 42 which runs over a sprocket 43 that is carried on a main countershaft 44, from which all of the various drives required in the machine are obtained.

The countershaft 44 extends transversely of the machine and has its ends journaled in bearings 45 and 46 that are carried by the side frames 3 and 4 of the machine, as best shown in Fig. 7. The countershaft 44, in turn, is driven by a pulley 47 that is mounted on a projecting end thereof and which is operated by a belt 48, running over a pulley 49 on the power shaft of a motor 50. The motor 50 is mounted on the base 2 as best shown in Figs. 3 and 6.

The envelopes are detained in position for receiving a clasp by means of a stop 96 (Figs. 4, 8 and 18) that is mounted between the belts on a rod 97. The rod 97 is reciprocably supported in a bracket 98 carried by the frame of the machine and is connected with an arm 99 of a rock lever 100 on a rock shaft 101 extending transversely of the machine and having its ends journaled in the side frames. The rock lever 100 also includes a rearwardly extending arm 102 carrying a roller 103 in contact with a cam 104 on a second cam shaft 105. The cam shaft 105 extends transversely of the machine and is rotatably mounted in the side frame (Fig. 7). The cam shaft 105 carries a sprocket 106 that is driven by a chain 107 operating over a sprocket 108 on the main countershaft 44 previously described, an idling sprocket 109 being provided to maintain the desired contact of the chain with the respective sprockets.

The stop 96 is retained in its up position and the roller 103 against the cam 104 by a spring 110 which connects the lever arm 99 with a fixed part of the frame.

When the envelope has been advanced to engagement with the stop 96, it is in position to be opened for reception of an anvil 111 (Figs. 7, 8, 16 and 23). The envelope is opened by a blast of air from a nozzle 112 (Figs. 3, 4 and 8) that is supported with the discharge thereof directed upon the edge of the back side C of the envelope.

This causes the back side C of the envelope to separate from the front side B sufficiently to pass the anvil 111 therebetween.

The nozzle 112 is carried on a bracket 113 that is adjustable along a rod 114 that extends rearwardly from one of a pair of spaced apart transverse plates 115—116. The plates 115—116 have foot flanges 117 secured to the side of the table top. The rod 114 extends rearwardly above the upper run 16 of the conveyer belt 18 and carries pressure rollers 118—119 to cooperate with the belts in advancing the envelope to the clasp attaching station. The envelopes move over the anvil 111 so that when the closure flap G advances beyond the forward terminal of the anvil, the anvil is in position to move within the envelope.

The anvil is supported from an arm 120 (Figs 4 and 23) which is fixed to a rod 121 that is reciprocated in bearings 122 and 123 of a bracket 125 that is fixed to the plate 115. The bracket 125 provides a longitudinal guide for the end 126 of the arm 120 so that the anvil is slidably supported at a fixed height. The arm 120 is shifted along the bracket by means of a link 127, which pivotally connects with the upwardly and laterally extending arm 128 of a bell crank 129 (Figs 3, 4 and 23). The bell crank is pivotally mounted on a pin 130 that extends from the side frame 4, as best shown in Figs. 3 and 4, and has a forwardly extending arm 131 which carries a roller 132 (Fig. 3) operating on a cam 133 which is attached to the cam shaft 105. The arm 131 is held with the roller in contact with the cam 133 by a spring 134 having one end fixed to the lever and its opposite end fixed to a part of the frame, as best shown in Fig. 3. The arm 120 is fixed from longitudinal movement on the rod 121 but is adapted to rock when the anvil is to be adjusted. Adjustment is effected by retaining the end 126 of the arm under a guide strip 135 that is adjustably supported on the bracket 125 by adjusting screws 136 to adjust the level of the anvil (Fig. 23).

The envelope is now in position and is prepared to receive a clasp blank. The clasp blank is applied by an applicator 137 which is carried between the arms 138 that project over the stopped envelope, the arms being carried by the plates 115—116.

As previously stated, means are provided on the machine for forming the clasp blanks from a roll of metal tape S. The tape S is carried on a reel 139 rotatable upon a spindle 140, which is carried by a bracket 141 attached to the forward end of the side frame 3 (see Figs. 2, 3, 4, 9, 10 and 13). The tape S is withdrawn from the reel and guided by a roller 142 (Fig. 1) into and through a tubular guide 143 that extends rearwardly and upwardly of the side frame 3 and terminates in a forwardly curving end from which the tape is drawn through a measuring device 144 which includes rollers 145 and 146, mounted on transverse shafts that are carried in bearings 147 within a frame 148. The frame 148 is carried on the bracket 149 that projects rearwardly from a lateral extension 150 of the side frame 3. The extension projects above the table top 5 to carry a forming mechanism 151, later to be described.

The roller 146 carries a ratchet wheel 152 that is fixed to the roller shaft and intermittently turned by means of a pawl 153, the pawl 153 being pivotally mounted on the side of a crank arm 154 arranged to swing on a projecting end of the shaft for the measuring roll 146, the crank arm being oscillated by a disk 155 through a connecting link 156 (see Figs. 1 and 2). The disk 155 is fixed to the outer end of the cam shaft 105. The link 156 is pivotally connected at one end with a laterally extending pin 157 on the crank arm 154 and the other end with a pin 158 that extends laterally from the disk 155 and in off-center relation therewith so that when the disk is rotated, the crank arm is oscillated to turn the roller 146 in a forward direction in cooperation with the other roller 145 in advancing the tape a predetermined distance for establishing the overall length of the material necessary to form the clasp H.

The roller 145 is driven by gears 146' and 146" which connect the shafts of the respective rollers (Fig. 3).

The tape, when advanced by the measuring rollers, passes along the flat upper face 159 of a support 160 and under a guide plate 161 that extends longitudinally of the support 160 to guide the tape between pairs of guide pins 162 and 163 (Figs. 11 and 13).

The guide pins 162 and 163 assure lateral positioning of the tape S relatively to upper and lower die blocks 164 and 165. The lower die block 165 is supported on a plate 166 that is carried on a die shoe 167 of the frame extension 150. The die block is of substantially rectangular shape and has a flat upper face 168 across which the tape is fed by the mechanism 144. The tape is guided across the face 168 between pairs of pins 169 and 170 having heads 171 extending over marginal side of the tape and which are accommodated in recesses 172 in the lower face 173 of the upper die block 164. Formed in the lower die block in alignment with the longitudinal center of the tape are spaced bores 174 and 175 registering with larger bores 176 and 177 in an insert 178. The insert 178 is mounted within the plate 166 and extends downwardly therethrough and through the die shoe 167, as best shown in Fig. 11. Slidably mounted in the bores of the insert are plungers 179 and 180 having heads 181 and 182 on the lower ends for engagement with cam lugs 183 and 184. The plungers 179 and 180 have upwardly extending reduced portions 185 and 186 to form shoulders 187 for seating springs 188 that bear against the shoulders to hold the plungers in retracted position and against the cam lugs 183 and 184. Extending upwardly from the reduced portions 185 and 186 are punch pins 189 and 190 having pointed ends 191 (Fig. 14) normally positioned immediately below the tape when the plungers are in retracted position and which are adapted to pierce the tape to form the prongs P when the plungers are moved upwardly against the action of the springs. The cam lugs 183 and 184 are carried on rock levers 193 and 194 fixed to a cross shaft 195 that is journaled in the extension 150 of the machine frame. The rocker arms are actuated by lifters 196 and 197 that are carried on a cross shaft 198 that is also journaled in the frame extension 150. The shaft 198 carries an arm 199 that is connected with a link 200, which has its other end connected with an eccentric 201 on a cross shaft 202. Fixed to the cross shaft is a sprocket 203 that is operated from a sprocket 204 on the shaft 105 by chain 205 (see Figs. 2, 6 and 7).

Carried by the lower die block, intermediate the punch pins, is an insert 206 across which the tape is extended and which has a projecting curved surface 207 to form the crimp L in the clasp blank, as later to be described.

The lower die block also has a transverse slot 208 and slidably mounted therein is an elevator 209 having an upper end face 210 arranged to form a continuation of the upper surface of the die block when the elevator is in its uppermost position (see Fig. 10). The elevator is resiliently retained in its uppermost position by a coil spring 211, contained in a recess 212 (Fig. 15) of the lower die block and which is larger than the width of the elevator 209 to form a stop 213 for a foot 214 on the lower end of the elevator.

The upper end of the spring 211 engages under the foot 214 and the lower end seats on the bottom of the recess. The upper face of the die block also has a transverse groove 215 to register with the crimp L when the tape is advanced across the face of the die, as later to be described.

The die block also has a transverse groove 216 at the forward side of the elevator 209 (Figs. 13 and 15) and substantially horizontally aligned therewith at the end of the die block is a groove 217 for a purpose later to be described.

Reciprocable in a vertical recess 218 in the forward end of the lower die block is a slide 219 having a sloping upper face portion 220. The slide 219 is actuated by a rocker 221 pivotally mounted on a pin 221' and which has one end connected with the slide by a link 222 (Fig. 12) and the opposite end is engaged with a pin 223 depending from the upper die shoe 224 to operate the slide when the upper die shoe is moved toward the lower die shoe as later described. The slide bends the hook M on the clasp blank to approximately a 45 degree angle when the tongue portion N of the clasp is bent over the end face of the die to a 90 degree angle, as shown in Fig. 10.

The upper die block 164 is resiliently suspended from the upper die shoe 224 by cap screws 164' that have the headed ends thereof slidable in the die shoe and the threaded ends are connected with the die block as shown in Fig. 9. A space is maintained between the die block and the die shoe by springs 164". The upper die shoe is a plate having a substantially flat lower face 223'. The die shoe is slidably supported in alignment with the lower die shoe by corner pins 225 that extend through bushings 226 carried in the upper die plate. The upper die shoe is actuated to bring the die blocks together by means of a ram assembly 227, later described.

Formed in the upper die block in registry with each of the punch pins 189 and 190 is a bore 228, and extending from the top side of the upper die block are counterbores 229, forming shoulders 230 (Fig. 14).

Slidably contained within the bores are strippers 231 having heads 232 contained in the counterbores 229. The heads 232 are yieldingly retained against the shoulders 230 by coil springs 234 seated against the heads 232 and threaded plugs 235 which close the outer ends of the counterbores, as shown in Figs. 10 and 11.

When the dies are in open position, strippers 231 register with the underface of the die block, but the strippers are pushed upwardly within the upper die block by the projecting ends of the punch pins 189 and 190 when the dies are in closed position as shown in Fig. 14.

Also formed in the upper die block is a slot 236 opening into a recess 237 in the upper face of the die block.

Slidably contained within the slot 236 is a blade or shear 238 having a thickness substantially corresponding to the width of the elevator 209, less the thickness of the tape S (see Fig. 15). The shear 238 has a head 239 (Fig. 11) that is fixed to the upper die shoe to retain the forward side of the shear in contact with the forward side of the elevator slot in the lower die block, and to leave ample space on the opposite side of the shear to accommodate the thickness of the tape as the hook M, which has been severed by the shear from the foremost clasp blank is bent downwardly to form the right angular bend as shown in Fig. 15. Also formed in the lower face of the upper die block in registry with the groove 215 is a transverse groove 240 to accommodate the crimp L (Fig. 15). Also formed in the lower face of the upper die block at the respective sides of the transverse groove 240 are recesses 241 (see Figs. 11 and 15) for accommodating the prongs P and Q of the cut off clasp blank.

Fixed to the underface of the upper die shoe at the end of the upper die block is a forming lug 242 having a lower end 243 projecting below the lower face of the upper die and adapted to bend the projecting tongue portion of the clasp downwardly to form the 90 degree angle bend and to cooperate with the slide 219 to form the 45 degree angle bend of the clasp blank (see Figs. 10, 11 and 12).

The forming lug 242 is secured to the upper die shoe by cap screws 244 that extend through suitable openings in the die shoe and into threaded openings of the forming lug as shown in Figs. 10 and 11.

Extending laterally from the lower die shoe in registry with the cut off clasp blank is a horn or rail 245 having upper and end faces 246 and 247 registering with and forming lateral continuations of the upper and end faces of the lower die block and across which the formed clasp blanks are moved in progressive relation by a plunger 248. The plunger 248 has fingers 249 and 250 slidable in the grooves 215, and 217 respectively.

The plunger 248 is reciprocated in timed relation with operation of the dies by a rod 251 which is slidably supported in a bracket 252 mounted on the side of the frame extension 150 (Fig. 12). Also mounted on the frame extension and projecting laterally therefrom are spaced apart arms 253 carrying a rock shaft 254. Fixed to the rock shaft and extending upwardly therefrom is an arm 255 carrying a roller 256 for engaging a head 257 on the projecting end of the rod 251. Fixed to and extending laterally from the shaft 254 in the direction of the machine is a lever arm 258 that is actuated from a transverse rocker shaft 259 which is carried in a bracket 260 mounted on the forward side of the frame extension 150. Fixed on the outer end of the shaft is an arm 261 that is connected with the lever arm 258 through a link 262 (Fig. 1). Fixed to the inner end of the rocker shaft 259 is a downwardly and rearwardly projecting lever 263 carrying a roller 264 engaging the periphery of a cam 265 that is fixed on the cam shaft 105.

The roller is retained in contact with the cam by a coil spring 266 having one end connected to the arm 261 and the other end connected with a part of the frame extension as indicated at 267 (Figs. 1 and 7).

The plunger 248 is retracted by the spring 266.

The upper die shoe is moved to and from the lower die shoe by the ram assembly 227 which includes laterally spaced rods 268 and 269 that are slidably mounted in the die shoe 167. The upper ends of the rods 268 and 269 are threaded and project through suitable openings in the upper die shoe to mount cushioning springs 270 that are seated on the upper face of the die shoe 224 and have their upper ends seated against washers 271 that are backed by adjusting nuts 272 for controlling action of the cushioning springs 270 in retaining the upper die shoe in contact with stop nuts 273 that are threaded on the ends of the rods at the underside of the die shoe.

The lower ends of the rods 268 and 269 are similarly threaded and extend through the ends 274 of a cross head 275 having a wrist pin 276 formed thereon intermediate the ends 274 (see Figs. 2, 6, 7 and 24).

The ends 274 of the cross head 275 are secured to the threaded ends of the rods by jamb nuts 277 engaging the upper and lower sides thereof. The ends 274 of the cross head have rollers 278 and 279 that move within slots 280 of transverse plates 281 and 282 attached to the inner and outer sides of the frame extension. The wrist pin 276 of the cross head is connected with a crank 283 on the cam shaft 105 by means of a connecting rod 284 (Figs. 6, 7 and 24).

The machine is so timed that after formation of each clasp blank, the plunger 252 acts to move the blanks along the horn 245 until they reach a position in line with the cinching head where the blanks are removed one at a time and carried to a position for application to the stopped envelope.

The blank carrier comprises a rotor 285 (Figs. 8, 25, 26 and 27) rotatably mounted on a shaft 286 having one end threaded into a socket 287 that is provided in the lower end of the housing 288 for the plunger 289 of the applicator or cinch 137.

The shaft extends forwardly therefrom directly over the applicating station for the clasp blank and the outer end is supported in an arm 290 of a gooseneck bracket 291 having a foot 292 fixed to the table top.

The housing 288 forms a vertical guide 293 for the plunger and has its lower end 295 supported above the table top by the plates 115 and 116.

The housing supports the plunger 289 with its forwardly projecting clinching foot 296 that pushes the prongs of the clasp through the paper of the envelopes and clinches them against the anvil 111, as later to be described.

The rotor 285 is carried alongside of the horn 245 with the upper periphery 297 thereof in substantial plane with the top face of the horn, while the lower peripheral portion 298 (Figs. 8 and 16) is spaced above the envelope a suitable distance to pass the tongues "N" of the clasp when the tongues are moving away from the cinch upon withdrawal of the second stop. The end face 299 is spaced forwardly from the forward face of the horn 245 to provide a passageway therebetween for the tongues of the clasp during their transposition from the horn to the applicating position (Fig. 8).

Formed transversely in the peripheral portion of the rotor are a series of equally spaced radial slots 300. Mounted in each slot is a permanent U-shaped magnet 301, the magnets being positioned in the respective slots with the poles 302 and 303 (Figs. 16, 25, 26 and 27) inset slightly from the end face 299 of the rotor 285. The sides of the slots 300 are beveled as at 304 to guide the tongues of the clasps into contact with the poles of the magnet when the endmost clasp on the horn is projected toward the magnet which is then registering with the tongue portion of the endmost clasp on the horn.

A push pin 305 is slidably mounted in an opening 306 of the horn, and has a head 307 slidably mounted in a rearwardly extending counterbore 308' as shown in Figs. 8 and 26. The push pin is normally retained in retracted position by means of a coil spring 309' that is enclosed within the counterbore and has one end seated against the bottom thereof and its opposite end against the head 307 (Fig. 26).

The opposite end of the head 307 engages an arm 308 of a rock lever 309 that is pivotally supported for rocking movement in a horizontal plane on a pin 310 that is carried by a fixed bracket 311 attached to the rear side of the horn (Fig. 25). The opposite end of the rock lever projects toward the dies and has a roller 313 mounted on the outer end thereof in position to engage the inclined face 314 of a wedge plate 315 that depends from the side of the upper die shoe 224 as best shown in Figs. 6, 7 and 25. Thus on each operation of the die, the rock lever 309 is actuated to cause the pin 305 to push the endmost clasp blank into engagement with the poles of the magnet after which the head 257 comes into operation during the upward movement of the ram so as to advance the blanks along the horn and present the next clasp to the succeeding magnet of the rotor, the rotor having been advanced one space by means of a ratchet pawl 316 engaging the teeth 317 of a ratchet wheel 318 forming a part of the rotor (Fig. 27).

The ratchet pawl 316 is pivotally mounted on an upwardly extending arm 319 of a bell crank lever 320 which is pivotally mounted on the transverse arm by means of a pin 321.

The bell crank has a laterally extending arm 322 that is connected through a pin and slot connection 323 with a link 324 that is connected with an ear 325 extending laterally from the upper die shoe 224 so that with each operation of the die, the ratchet wheel 318 rotates one space to move the next magnet into position for engaging the next clasp blank, the link being provided with a slot 326 to give the required movement to the bell crank (Figs. 5 and 27). With each operation of the die shoe, the rotor is advanced until the clasp blank reaches the position directly in alignment with the clinching foot and under guide pins 327 and 328, so that as the foot moves downwardly, the pins pass through the openings which have been previously formed by punching of the prongs as shown in Fig. 8.

The guide pins 327 and 328 that enter the openings in the clasp are spring pressed, as best shown in Fig. 8. Downward movement of the clinching foot slides the blank from engagement with the magnet (Fig. 16) and brings the body portion thereof into contact with the envelope, for forcing the prongs P and Q through the paper and into clinching relation with clinching bosses 327' and 328' on the anvil 111.

As the clinching foot moves upwardly on its return movement, the anvil is withdrawn and the stop 96 moves out of position to allow the envelope to be carried along by the belt.

In order that the magnet wheel is advanced the same amount for each operation of the ratchet 316, the rotor also includes a wheel 329 having notches 330 registering with the magnets of the magnet wheel.

The notches 330 are engaged by a wheel 331 on an arm 332 that is pivoted on the arm 290 of the wheel carrier as indicated at 333. The arm 332 is connected with the arm of the wheel carrier by a spring 334 to bring the wheel 331 into engagement with the uppermost notch 330 and to center the magnet wheel with respect to the clasp applicating portion of the envelope (see Figs. 5 and 8).

The cinching plunger is reciprocated by means of a rocker arm 335 that is pivotally supported on a pin 336 which is carried by an upper extension 337 of the spaced plates 115 and 116 which carry the housing 288 for the cinching head.

The rocker arm 335 is arranged transversely of the machine directly above the clasp horn 245 and has a slotted inner end 338 carrying a slide block 339 that is mounted on a pin 340 extending from the stem of the cinching plunger and which reciprocates through a slot 340' (Fig. 5) in the side of the plunger housing 288, as will be understood.

The opposite end of the rocker arm 335 is pivotally connected as at 341 with a link 342 having its lower end connected through a pin 343 with an arm 344 (Figs. 3, 5 and 17). The arm 344 is pivoted as at 345 to the side frame 4 and the forward end is guided for arcuate movement in a guide 346 that is also attached to the side frame of the machine. The free end of the arm 344 extends beyond the pin connection 343 and carries a roller 347, operating on a cam 348. The cam 348 is fixed on the cam shaft 105.

The arm 344 is held with the roller 347 in contact with the cam 348 by a spring 349 (Figs. 3 and 17) having one end connected with a pin 350 on the arm 344 and its other end connected with the base portion of the machine frame.

The link 342 is composed of upper and lower sections 351 and 352 that are interconnected by a lost motion connection 353 with the sections held in their extended position by a coil spring 354 seated on a head 355 of the lower section and bearing against a collar 356 of the upper section.

Operating above the stopped envelope is a reciprocatory shaft 357 that extends transversely of the machine and has its ends journaled in bearings 358 and 359 that are carried on arms 360 and 361 (Fig. 4). The arms 360 and 361 are pivoted on brackets 362 (Fig. 3) that are carried by the respective side frames of the machine and which extend forwardly to mount the bearings thereon.

One end of the shaft 357 carries a sprocket 363 that is driven by a chain 364 operating over a drive sprocket 365 on the roller shaft 39 (Fig. 2). The shaft 357 is reciprocated by a rocker arm 366 pivotally mounted on the side frame of the machine as indicated in Figs. 3 and 17.

The rocker arm 366 has a cam follower 368 engaging a cam 369 on the shaft 105 (Fig. 17). The forward end of the rocker arm is connected by a link 370 with the arm 361. The cam follower 368 is kept in engagement with the cam by a coil spring 371 having one end hooked to the rocker arm and the other to a fixed part of the frame 4, as best shown in Figs. 3 and 17.

Mounted on the shaft 357 directly in alignment with the applied clasp is a roller 372 adapted for peripheral contact with the top face of the envelope to cooperate with the roller 36 in assisting in advancing the envelope upon release thereof by the stop 96 and to bend the tongue portion N of the clasp to an angle of substantially 45 degrees as the clasp passes through a circumferential groove 373 (Figs. 5 and 8) in the roller 372, the diameter of the bottom of the groove being such that the tongue portion N of the clasp is pressed toward the body portion a sufficient amount to provide the desired angle of the clasp as the envelope passes into position for completing the clasp by bending the clasp into substantially flat contact with the body portion and seating the hook M to the desired angle.

The envelope is then engaged by a stop 374 (Figs. 4 and 18). The stop 374 is carried on the end of a rod 375 that is adjustable within a head 376 similar to the other stop previously described. The head 376 is carried on a rocker arm 377 that is pivotally carried by a bracket 378 mounted on the side of the table top as best shown in Fig. 18.

The arm 377 has a depending portion 379 that is connected with a rocker arm 380 on the shaft 101 (Fig. 18). The rocker arm has a pin and slot connection 381 with the end 379 of the arm 377. The opposite end of the rocker arm 380 carries a cam follower 382 working on a cam 383 on the shaft 105. The rocker arm 380 is kept in contact with the cam by a spring 384 that connects the rear end of the rocker arm with the transverse rail 6 of the machine, as best shown in Fig. 6.

Carried near the pivoted end of the rocker arm 377 is an upwardly and forwardly extending arm 385 carrying a transverse rod 386 mounting an arm 387 (Fig. 18) which carries a roller 388 that is held in yielding contact with the envelope engaged by the stop by a coil spring 389 having one end connected with a tail portion 390 of the arm 387 and its other end fixed to a pin 391 extending radially of the rod 386 as best shown in Fig. 18.

Mounted adjacent the bracket 378 is a bracket 392 carrying a transverse rocker arm 393 that oscillates above the path of travel of the envelopes and which has an end 394 carrying a pressure applying head 395 which has a flange 396 fixed to the side of the arm and its other flange 397 extending underneath and rearwardly of the arm as shown in Fig. 5.

The flange 397 carries pressure pins 399 and 400 that are spaced apart thereon to engage over the folds forming the tongue and hook portions of the clasp so that when the head is moved downwardly and in the direction of a fixed anvil 401, the pins 399 and 400 apply pressure sufficient to give the final bends and complete formation of the clasp. The anvil 401 is supported between the upper runs of the conveyer belts and has a transverse groove 402 in registry with the crimp L so that the pressure applied by the pin 400 does not alter the formation of the crimp. (See Fig. 22.)

The rocker 393 is operated from the rocker arm 344 which actuates the clinching head. This is effected through a rocker arm 403 that is pivotally mounted on the side frame of the machine as indicated at 404 and which has the free end connected by a pin 405 with a link 406 that is connected with the outer end of the rocker arm 393 by a pin 407 (Figs. 3 and 17).

The rocker arm 403 is connected with the rocker arm 344 by a link 408 that interconnects the arm through pivot pins 409 and 410, as shown in Fig. 3. The pivot pin 410 has a lost motion connection with the arm 344 to provide a resilient connection with the link through a compression spring 411 that engages a seat 412 on the lever 344 and has its upper end held in compression by a screw 413 adjustably carried in a lug 414 on the link 408 (Fig. 17).

Supported above the path of the envelopes by the plate 116 and a bracket 415 is a longitudinal bar 416 which extends longitudinally above the upper run of a lefthand belt to mount lever arms 417 and 418 carrying rollers 419 and 420 that apply sufficient pressure of springs 421 and 422 to the envelope to assure advance of the envelope upon release of the stop 374 for discharging the envelope from the ends of the conveyer belt, as to a printing machine (not shown) or a station (not shown) where the envelopes are boxed.

The bar 416 has an upwardly offset portion 423 (Fig. 5) in registry with the pressure applying arm previously described, to accommodate movement thereof.

The bar 416 also carries a laterally extending arm 424 which projects over the opposite belt and has a depending portion carrying a runner 425 to cooperate with the rollers 419 and 420 to assure advance of the finished envelope (Fig. 4).

In using the machine, the guide rails 19 and other parts of the machine are adjusted for the size of the envelopes to be run through the machine.

A roll of metal strip S is applied to the spindle 140 and the strip S is threaded through the guide tube 143 and passed between the rollers 145 and 146 of the measuring device 144 with the end of the tape resting upon the flat upper face 159 of the support 160 to pass under the guide plate 161 and between the pairs of pins 162 and 163. With the motor 50 in operation, the belt 48 is driving the main countershaft 44 which in turn is driving the cam shaft 105 through the chain 107. The conveyer belts 17 and 18 are also operating through the chain 42 and gears 37 and 38 to advance the envelopes.

The eccentric 155 on the cam shaft 105 operates the arm 154 through the link 156 swinging the pawl 153 for intermittently advancing the strip feeding rollers 145 and 146 to pass on each operation a sufficient length of strip into the die unit to form a clasp blank, the timing being such that the strip is fed during the upstroke of the die ram, or after the die ram has come to rest in its upper position. The die ram is being actuated from the cam shaft 105 through the crank 283, connecting rod 284, and cross head 275 (Figs. 2, 6, 7, and 24). The upper die block is moving in regular periods to and from the lower die block with each operation to cut off and form the various initial bends in the clasp blanks. The strip S on being passed between the die blocks is kept in registry with the forming elements thereof by the pairs of guide pins 169 and 170, with the strip passing under the heads thereof to control the strip relatively to the lower die block when the upper die block moves therefrom. The initial operations are to form the prongs P and Q and the transverse bend or crimp L. The prongs are formed by the punch pins 174 and 175 that move upwardly through the strip in timed relation with the ram by means of the lifters 196 and 197 on the rock shaft 198, the lifters raising the arms 193 and 194 to carry the lugs 183 and 184 against the heads 181 and 182 of the plungers 179 and 180 and lift the plungers against action of the springs 188. The mechanism is so timed that the punch pins operate during the dwell at the lower end of the stroke of the ram while the crank is moving across lower dead center position.

The lifter shaft 198 is being operated by the crank 199 and link 200 which is connected with the eccentric 201 on the shaft 202 that is driven from the cam shaft 105 through the chain 205. The operation of the punch pins is therefore kept in timed relation with the operation of the ram as both mechanisms are positively driven from the common shaft 105.

When the upper die block comes into contact with the lower die block the crimp is formed over the surface 207 of the insert 206. When the punch pins move through the strip they act against the stripper 231 to compress the springs 234 so that when the ram lifts the upper die block the springs become effective to push the strip S in contact with the face of the lower die block as the pins are being withdrawn and the upper die block moves away from the lower die block.

On the downward movement of the upper die block, the previously punched and crimped clasp blank is severed and the terminal end thereof is bent at right angles. This is effected through take-up of the springs 164" that resiliently hold the upper die block from the upper die shoe 224 as shown in Fig. 9. The shear blade 238, being carried from the upper die shoe 224, is retracted between the upper die block, but on take-up of the spacing between the upper die block and the upper die shoe the shear is projected through the slot 236 and cooperates with the stationary shear edge on the lower die block to cut through the strip S and to bend the terminal hook M downwardly at right angles to the body portion of the strip, as best shown in Fig. 15. The shear blade 238 pushes the elevator 209 downwardly against the action of the spring 211 and on upward movement of the ram the upper die shoe moves away followed by the upper die block so that the spring 211 is effective in lifting the elevator to carry the terminal M of the strip above the surface of the lower die block whereupon the next advanced movement of the strip by the feed rollers 145 and 146 move the severed portion of the strip forwardly with the terminal underlying the lug 242. In this position of the severed portion of the strip, the prongs P and Q are accommodated within the recesses 241 of the upper die block and the crimp L is located directly over the guide slot 215 and in position to be engaged by the prong or finger 249 of the plunger 248. On the next downstroke, the lug 242 comes into contact with the projecting portion N of the strip and bends it over the forward face of the lower die block. At the end of the stroke, the slide 219 is effective to bend the terminal M of the strip to an angle of approximately 45 degrees from the portion N. The slide 219 is being actuated in timed relation with the ram by the rocker arm 221 that is actuated by the pin 223 which depends from the upper die shoe (Fig. 12).

The foremost clasp blank is now in its initial form and is advanced laterally onto the horn or rail 245. A preformed blank is pushed onto the horn on each operation of the die ram by the plunger 248, which is being actuated by the rocker arms 255 and 258 through the link 262, which link is being operated by the arm 261 on the shaft 259. The shaft in turn is being rocked by the lever 263 and cam 265 on the cam shaft 105. After each operation the plunger 248 is retracted by the spring 266.

It is obvious that on each stroke of the die ram, a clasp blank is formed and the formed blank is pushed off the lower die block onto the horn which advances the previously formed blanks until the foremost blank is in position to be engaged by one of the magnets 301 of the rotor 285, which rotor carries the pre-formed blanks into position for application to an envelope that is detained by the stop 96, the stop 96 having been moved into position by the cam 104, rocker arm 100, and rod 97. At this station, the body of the envelope is in position directly under the applicator foot of the clasp applicator. While the envelope is moving into position, a blast of air from the nozzle 112 blows into the open end of the envelope to raise the back side C from the face side B and permits entrance of the anvil 111 which is carried by the arm 120. The anvil is being moved into position under the applicator foot by the rod 121 which is actuated through the link 127 that is connected to the arm 128 of the bell crank 129. When the cam 133 comes into contact with the roller 132 the bell crank is actuated against action of the spring 134 to move the anvil into position for clinching the prongs, as later described.

Getting back to the clasp blank, the endmost clasp blank on the horn is removed by the rotor 285 and carried in intermittent steps into position for application.

When the upper die shoe moves downwardly, the link 326 rocks the bell crank 320 to swing the pawl 316 to advance the rotor one space. The clasp to be removed is pushed into contact with a magnet 301 by movement of the rocker 309 when the cam plate 315 moves into contact with the roller 313. The movement occurs just prior to the advance of the magnet rotor 285. The rotor 285 is resiliently held in stopped position by means of the roller 331 which engages one of the dwells 330 in the wheel 329. A clasp carried by the lowermost magnet on the rotor 285 has been turned through an angle of 180 degrees so that the tongue portion N is upward and the body portion K is extending horizontally directly below the foot 296 of the applicator plunger 289 with the pins 327 and 328 in the foot of the plunger being in position to engage within the openings of the clasp, and the prongs P and Q are facing downwardly over the envelope as shown in Fig. 16.

When the applicator plunger moves downwardly the pins 327 and 328 pass through the clasp openings, to align the clasp with the clinching bosses 327' and 328'. When the plunger moves downwardly, it forcibly slides the clasp from the poles 302 and 303 of the magnet 301, as shown in Fig. 16, and carries the clasp into contact with the C face of the envelope. The plunger 289 is operated in timed relation by means of the rocker arm 335, link 342 and cam 348 on the cam shaft 105. The force of the plunger pushes the prongs of the clasp through the face of the envelope and they are clinched over the inner face side by contact with the anvil. After operation the parts return to their normal position under action of the spring 349 and the anvil is withdrawn by contraction of the spring 134 as the cam 133 rides from under the roller 132.

The stop 96 now moves out of detaining position so that the rollers 372 and 36 are effective with the belts 17 and 18 advancing the envelope to the last stop 374. As the clasp approaches roller 372, the roller is raised by the link 370 against action of the spring 371. When the cam 369 moves into position for actuating the rocker 366 the roller 372 is lowered, so that as the tongue of the clasp passes through the groove of the roller, the tongue is bent toward the body portion of the clasp.

The advance of the envelope is continued by means of the belts and pressure rollers until the bottom edge of the envelope engages the stop 374, whereupon the arm 393 actuates to carry the pins 399 and 400 into pressing contact with the initial bends in the clasp to complete the formation thereof (see Fig. 21). The pressure is applied to the pins 399 and 400 (see Fig. 22) through the rocking of the arm 393 by its link connection 408 with the rocker arm 344. After the pressure is applied the rocker arm 393 returns to its normal position and the stop 374 is withdrawn permitting discharge of the envelope from off the end of the conveyor belts.

If for some reason a clasp blank is not removed by the plunger of the clinching device, further advance of the rotor 285 brings the clasp past the foot of the plunger 289 and the clasp blank is removed by the electromagnet 426, which is stronger than the force effected by the permanent magnets 301 (see Fig. 4).

From the foregoing it is obvious that I have provided a machine for applying clasps of the type disclosed in United States Letters Patent No. 2,349,127, by providing means for forming the clasp blanks, then providing means for feeding the envelopes and clasp blanks to the means for applying the clasp blanks, after which means is provided to complete formation of the clasps. In this way, simple and effective mechanisms are provided for applying the clasps without interference by the tongues of the clasps.

What I claim and desire to secure by Letters Patent is:

1. In an apparatus for applying clasps of the type having an attaching portion and a tongue overlying the attaching portion, means for individually advancing the envelopes, means for applying the attaching portion of the clasp blank with the tongue extending at substantial right angles to the attaching portion, means in the path of the envelope for bending the tongue over the attaching portion, a stop at each station, and means for moving the stops into and out of stopping relation with the envelope to effect dwells at the respective stations.

2. An apparatus for attaching a clasp to an envelope for securing the closure flap thereof, including means for feeding a metal strip, means for cutting and forming a section of the metal strip into a clasp blank having prongs in an attaching portion of the clasp blank, means for forming a crimp transversely of the attaching portion intermediate said prongs, means for bending the strip at substantially right angles to the attaching portion to form a tongue portion, means for forming a hook on the tongue portion, means for bringing the clasp blank into position on the envelope, means for pressing the prongs through the material of the envelope, means for clinching the prongs, and means for bending the tongue portion over the attaching portion to bring the hook thereof into the crimp.

3. An apparatus for applying a clasp to an envelope in which the clasp has an attaching portion, prongs projecting from the attaching portion at respective sides of a transverse crimp and a lateral tongue portion at an end of the attaching portion with a hook on the tongue portion and the envelope has a closure flap provided with an opening to be engaged by the hook of the clasp, said apparatus including means for moving an envelope along a fixed path, means for feeding a clasp to bring the attaching portion into position on the envelope, means for pressing the prongs through the material of the envelope, means cooperating with the pressing means for clinching the prongs, and means for bending the tongue portion to bring the hook thereof into the crimp.

4. An apparatus for applying a clasp to an envelope in which the clasp has an attaching portion, prongs projecting from the attaching portion at respective sides of a transverse crimp and a lateral tongue portion at an end of the attaching portion with a hook on the tongue portion and the envelope has a closure flap provided with an opening to be engaged by the hook of the clasp, said apparatus including means for moving the envelope along a fixed path, means for feeding a clasp to bring the attaching portion into position on the envelope, means for pressing the prongs through the material of the envelope, means cooperating with the pressing means for clinching the prongs, means for bending the tongue portion to bring the hook thereof into the crimp, and means for applying pressure upon said bend of the tongue to flatten the bend.

5. In an apparatus of the character described, the combination of means for individually advancing an envelope from a first station through a second station, means at said first station for applying an attaching portion of a clasp blank which has a tongue extending at substantial right angles to the attaching portion and provided with a hook for engaging an opening formed in the envelope flap, means in the path of the envelope as said envelope is conveyed from said first station to the second station for bending the tongue over the attaching portion, means at the second station for applying pressure to the end of said tongue for imparting a pre-determined spring action in the tongue, a stop at each station, and means for moving the stops into and out of stopping relation with the envelope to effect a dwell of the envelope at the respective stations.

6. In an apparatus of the character described, the combination of a plurality of operating stations, means for individually advancing envelopes through a fixed path, means in the path of said advancing means for applying to each individual envelope an attaching portion of a clasp blank which has a tongue extending at substantial right angles to the attaching portion and provided with a hook for engaging an opening formed in a closure flap of said envelope, means for forming the clasp blank in synchronism with the operation of the clasp blank attaching means, means in the path of the envelope as said envelope is conveyed by said advancing means from said clasp applying means for bending the tongue over the attaching portion, an envelope stop, and means for moving the stop into and out of stopping relation with the envelope to effect dwell of the envelope when the clasp blank is applied by said clasp blank applying means.

7. In an apparatus for applying clasps to envelopes for securing closure flaps thereof, the combination of means for conveying the envelopes through a fixed path, means for feeding a metal strip in timed relation with movement of the envelopes, forming dies acting in timed relation with the strip feeding means for forming the strip into individual clasp blanks having attaching portions provided with openings and prongs surrounding the openings and having a tongue extending at substantial right angles to the attaching portion and provided with a hook, means for feeding and guiding said clasp blanks from the forming dies, means for removing the clasp blanks from the feeding and guiding means and for carrying the clasp blanks to an applicating position in the path of the envelopes, clasp applicating means for projecting the prongs into the envelopes and for clinching the prongs, and means in the path of the envelopes for bending the tongue over the attaching portion.

8. In an apparatus for applying clasps to envelopes for securing closure flaps thereof, the combination of means for conveying the envelopes through a fixed path in consecutive order, means for feeding a metal strip in timed relation with movement of the envelopes, forming dies acting in timed relation with the strip feeding means for forming the strip into individual clasp blanks having attaching portions provided with openings and prongs surrounding the openings and having a tongue extending at substantial right angles to the attaching portion and provided with a hook, means for feeding and guiding said clasp blanks from the forming dies, means for removing the clasp blanks from the feeding and guiding means and for carrying the clasp blanks to an applicating position in the path of the envelopes, clasp application means for projecting the prongs into the envelopes and for clinching the prongs, means in the path of the envelopes for bending the tongue over the attaching portion, and means in the path of the envelopes for applying pressure directly upon said bend for flattening the tongues with respect to the attaching portions.

9. In an apparatus for applying clasps to envelopes for securing closure flaps thereof, the combination of means for conveying the envelopes through a fixed path, means for feeding a metal strip in timed relation with movement of the envelopes, forming dies acting in timed relation with the strip feeding means for forming the strip into individual clasp blanks having attaching portions provided with openings and prongs surrounding the openings and having a tongue extending at substantially right angles to the attaching portion by a right angular bend and provided with a hook provided by a bend of lesser angle, means for feeding and guiding said clasp blanks from the forming dies, means for removing the clasp blanks from the feeding and guiding means and for carrying the clasp blanks to an applicating position in the path of the envelopes, clasp applicating means for projecting the prongs into the envelopes and for clinching the prongs, means in the path of the envelopes for bending the tongue over the attaching portion, and means spaced apart in the path of the envelopes in accordance with spacing between said bends for applying direct pressure to said bends for flattening the tongues with respect to the attaching portions to complete shaping of the hook.

10. In a machine for applying clasps to envelopes for securing the closure flaps thereof, the combination of means for conveying the envelopes in consecutive order, clasp forming dies for forming a strip into individual clasp blanks having attaching portions provided with openings and prongs surrounding the openings and having a tongue extending at substantially right angles to the attaching portion and provided with a hook, means for feeding the strip to said dies, an anvil, means for supporting the anvil for movement into and out of an envelope on the conveying means, means for feeding and guiding said clasp blanks from the forming dies, means for removing clasp blanks from the feeding and guiding means and for carrying the clasp blanks to a position on the envelope containing the anvil, means registering with the anvil for projecting the prongs into the envelope for clinching upon the anvil, means for increasing bends of the tongues over the attaching portions of the attached clasps, and means for applying an additional bending pressure directly upon said bends to flatten the tongues with respect to the attaching portions after attachment of the clasps to the envelopes.

11. In a machine of the character described, means for forming and applying clasps to envelopes including clasp forming dies, means for feeding a strip to the clasp forming dies to form a clasp blank on each operation of the forming dies which has an attaching portion provided with openings and prongs surrounding the openings and a tongue depending from the attaching portion, a rail extending laterally from the forming dies and having an upper face for supporting the attaching portion of the clasp blanks with the tongue portions depending at the side of the rail, means for operating the dies, a plunger operable in synchronism with the forming dies for discharging of formed clasp blanks from the said dies onto the rail and advancing previously formed clasp blanks along the rail, a rotor alongside the end of the rail opposite said dies, a magnet carried by the rotor in position to attract and engage the depending tongue of the foremost clasp blank, means for advancing the rotor to carry the attaching portion of the clasp blanks from said rail to a position with the tongue portion extending upwardly and the attaching portion extending laterally over an envelope, a clasp blank applicator including a foot portion having resiliently supported pins adapted to engage in the openings of the attaching portion of the clasp blanks to position the clasp blanks and effect withdrawal of a clasp blank from the magnet on operation of the clasp applicator, a clinching anvil cooperating with the foot of the applicator to clinch the prongs into the envelope, and means for operating the applicator and the clinching anvil in timed relation with operation of the forming dies.

12. In a machine of the character described, means for forming and applying clasps to envelopes including clasp forming dies, means for feeding a strip to the clasp forming dies to form a clasp blank on each operation of the forming dies which has an attaching portion provided with openings and prongs surrounding the openings and a tongue depending from the attaching portion, a rail extending laterally from the forming dies and having an upper face for supporting the attaching portion of the clasp blanks with the tongue portions depending at the side of the rail, means for operating the dies, a plunger operable in synchronism with the forming dies for discharging of formed clasp blanks from the said dies onto the rail and advancing previously formed clasp blanks along the rail, a rotor alongside the end of the rail opposite said dies, a magnet carried by the rotor in position to attract and engage the depending tongue of the foremost clasp blanks, means for advancing the rotor to carry the attaching portion of the clasp blanks from said rail to a position with the tongue portion extending upwardly and the attaching portion extending laterally over an envelope, a clasp applicator having a foot, means on the foot adapted to engage in the openings of the attaching portion of the clasp blank to position the clasp blank and effect withdrawal of the clasp blank from the magnet on operation of the applicator, means for discharging air into the envelopes to open the envelopes, a clinching anvil, means for projecting the clinching anvil into the opened envelope for clinching the prongs upon actuation of the applicator, and means for actuating the applicator.

13. In a machine of the character described, means for forming and applying clasps to envelopes including clasp forming dies, means for feeding a strip to the clasp forming dies to form a clasp blank on each operation of the forming dies which has an attaching portion provided with openings and prongs surrounding the openings and a tongue depending from the attaching portion, a rail extending laterally from the forming dies and having an upper face for supporting the attaching portion of the clasp blanks with the tongue portions depending at the side of the rail, means for operating the dies, a plunger operable in synchronism with the forming dies for discharging of formed clasp blanks from the said dies onto the rail and advancing previously formed clasp blanks along the rail, a rotor alongside the end of the rail opposite said dies, a magnet carried by the rotor in position to attract and engage the depending tongue of the foremost clasp blank, means actuated by the applicator for pushing the clasp blank into contact with the magnet, means for advancing the rotor to carry the attaching portion of the clasp blank from said rail to a position with the tongue portion extending upwardly and the attaching portion extending laterally over an envelope, a clasp applicator having a foot portion to engage the attaching portion of the clasp blank and to carry the clasp blank into contact with the envelope, means for actuating the applicator, a clinching anvil, means for discharging air into the envelope for opening the envelope to receive the clinching anvil, and means for moving the clinching anvil into the opened envelope and to withdraw the clinching anvil after clinching of the prongs, and means for operating the applicator.

14. In a machine of the character described, means for forming and applying clasps to envelopes including clasp forming dies, means for feeding a strip to the clasp forming dies to form a clasp blank on each operation of the forming dies which has an attaching portion provided with openings and prongs surrounding the openings and a tongue depending from the attaching portion, a rail extending laterally from the forming dies and having an upper face for supporting the attaching portions of the clasp blanks with the tongue portions depending at the side of the rail, means for operating the dies, a plunger operable in synchronism with the forming dies for discharge of formed clasp blanks from the said dies onto the rail and advancing previously formed clasp blanks along the rail, a rotor alongside the end of the rail opposite said dies, a magnet carried by the rotor in position to attract and engage the depending tongue of the foremost clasp blank, means for conveying the envelopes under the rotor in consecutive order, means for advancing the rotor to carry the attaching portion of the clasp blank from said rail to a position with the tongue portion extending upwardly and the attaching portion extending laterally over an envelope on the conveying means, a clasp applicator having a foot portion to engage the attaching portion of the clasp blank and to carry the clasp blank into contact with the envelope, a clinching anvil, means for discharging air into the envelope for opening the envelope to receive the clinching anvil, means for moving the clinching anvil into the opened envelope and to withdraw the clinching anvil after clinching of the prongs, means for operating the clasp applicator, means for pushing the clasp blank into contact with the magnet, and an electromagnet between the foot of the applicator and said rail, said electromagnet being of greater strength than the magnet on the rotor to remove any clasp blank carried beyond the foot of the applicator.

15. In a machine of the character described, means for forming and applying clasps to envelopes including clasp forming dies, means for feeding a strip to the clasp forming dies to form a clasp blank on each operation of the forming dies which has an attaching portion provided with openings and prongs surrounding the openings and a tongue depending from the attaching portion, a rail extending laterally from the forming dies and having an upper face for supporting the attaching portion of the clasp blanks with the tongue portions depending at the side of the rail, means for operating the dies, a plunger operable in synchronism with the forming dies for discharging of formed clasp blanks from the said dies onto the rail and advancing previously formed clasp blanks along the rail, a rotor alongside the end of the rail opposite said dies, means for conveying the envelopes in consecutive order under the rotor, a magnet carried by the rotor in position to attract and engage the depending tongue of the foremost clasp blank, means for advancing the rotor, an operative connection between the forming dies and the rotor advancing means to carry the attaching portion of the clasp blanks from said rail to a position with the tongue portion extending upwardly and the attaching portion extending laterally over an envelope on the conveying means, a clasp applicator having a foot alongside the rotor, means on the foot adapted to engage in the openings of the attaching portion of the clasp blank to position the clasp blank and effect withdrawal of the clasp blank from the magnet on operation of the applicator, means for discharging air into the envelopes for opening the envelopes, a clinching anvil, means for projecting the clinching anvil into the opened envelope for clinching the prongs upon actuation of the applicator, means for actuating the applicator, and means for bending the tongue portion over the attached portion of the clasp.

16. In a machine of the character described, means for applying clasps of a type including an attaching portion provided with openings and prongs surrounding the openings and having a tongue depending from the attaching portion and provided with a hook, said means including a rail having an upper face for supporting the attaching portion of the clasp blanks with the tongues depending at a side of the rail, a plunger pushing the clasp blanks along the rail, a rotor alongside the rail, means extending under the rotor for conveying an envelope under the rotor, a magnet carried by the rotor in position to attract and engage the depending tongue of the foremost clasp blank, means carried by the rail in registry with said foremost clasp blank for engaging the depending tongue of the foremost clasp blank to assure engagement thereof by the magnet, means for advancing the rotor to carry the clasp blank to a position with the tongue portion extending upwardly and the attaching portion extending laterally over the envelope on the conveying means, a clinching anvil, means for discharging air into the envelope for opening the envelope to receive the clinching anvil thereinto, a clasp applicator having a foot portion to engage the attaching portion of the clasp blank to effect withdrawal of clasp blank from the magnet and bring the attaching portion into contact with the envelope to project the prongs into clinching contact with the anvil, and means for operating the applicator and the clinching anvil.

17. In a machine of the character described, means for applying clasps of a type including an attaching portion provided with openings and prongs surrounding the openings and having a tongue depending from the attaching portion and provided with a hook, said means including a rail having an upper face for supporting the attaching portion of the clasp blanks with the tongues depending at a side of the rail, a plunger pushing the clasp blanks along the rail, a rotor alongside the rail, means extending under the rotor for conveying an envelope under the rotor, a magnet carried by the rotor in position to attract and engage the depending tongue of the foremost clasp blank, means carried by the rail in registry with said foremost clasp blank for engaging the depending tongue of the foremost clasp blank to assure engagement thereof by the magnet, means for advancing the rotor to carry the clasp blank to a position with the tongue portion extending upwardly and the attaching portion extending laterally over an envelope, a clinching anvil, means for discharging air into the envelope for opening the envelope to receive the clinching anvil thereinto, a clasp applicator having a foot portion to engage the attaching portion of the clasp blank to effect withdrawal of clasp blank from the magnet and bring the attaching portion into contact with the envelope to project the prongs into clinching contact with the anvil, means for operating the applicator including the clinching anvil, and means for bending the tongue portion over the attached portion.

18. In a machine of the character described, means for applying clasps of a type including an attaching portion provided with openings and prongs surrounding the openings and having a tongue depending from the attaching portion and provided with a hook, said means including a rail having an upper face for supporting the attaching portion of the clasp blanks with the tongues depending at a side of the rail, a plunger pushing the clasp blanks along the rail, a rotor alongside the rail, means extending under the rotor for conveying an envelope under the rotor, a magnet carried by the rotor in position to attract and engage the depending tongue of the foremost clasp blank, means engaging the depending tongue of the foremost clasp blank to assure engagement thereof by the magnet, means for advancing the rotor to carry the clasp blank to a position with the tongue portion extending upwardly and the attaching portion extending laterally over an envelope, a clinching anvil, means for discharging air into the envelope for opening the envelope to receive the clinching anvil thereinto, a clasp applicator having a foot portion to engage the attaching portion of the clasp blank to effect withdrawal of clasp blanks from the magnet and bring the attaching portion into contact with the envelope to project the prongs into clinching contact with the anvil, means for operating the applicator including the clinching anvil, means for bending the tongue portion over the attached portion, and means for applying additional bending pressure directly to said bend to flatten the tongue portion relatively to the attached portion.

No references cited.